United States Patent
Radisek

(10) Patent No.: US 8,092,182 B2
(45) Date of Patent: Jan. 10, 2012

(54) WIND TURBINE BLADE SUPPORT STRUCTURE

(76) Inventor: Theodore Radisek, Euclid, OH (US)

( * ) Notice: Subject to any disclaimer, the term of this patent is extended or adjusted under 35 U.S.C. 154(b) by 1091 days.

(21) Appl. No.: 11/855,314

(22) Filed: Sep. 14, 2007

(65) Prior Publication Data

US 2010/0221109 A1 Sep. 2, 2010

(51) Int. Cl.
*F01D 5/30* (2006.01)
*F03D 11/00* (2006.01)

(52) U.S. Cl. .............. 416/204 R; 416/244 R; 29/889.2; 29/889.21; 29/897

(58) Field of Classification Search .............. 416/210 R, 416/204 R, 244 R, 111, 132 B, 156, 211, 416/210 A; 29/889.2, 889.21, 897
See application file for complete search history.

(56) References Cited

U.S. PATENT DOCUMENTS

| | | | | |
|---|---|---|---|---|
| 4,350,985 A * | 9/1982 | Arrigoni | ...................... | 343/702 |
| 4,421,458 A * | 12/1983 | Allan et al. | ................... | 416/117 |
| 5,203,672 A * | 4/1993 | Wolf | .............................. | 415/2.1 |
| 5,299,913 A * | 4/1994 | Heidelberg | ............... | 416/197 A |
| 5,503,525 A * | 4/1996 | Brown et al. | ................... | 416/24 |
| 5,531,567 A * | 7/1996 | Hulls | .............................. | 416/87 |
| 6,142,414 A * | 11/2000 | Doolittle | ......................... | 244/25 |
| 6,320,273 B1 * | 11/2001 | Nemec | ............................ | 290/55 |
| 2003/0159368 A1 * | 8/2003 | Osterberg | ...................... | 52/81.3 |

* cited by examiner

*Primary Examiner* — Edward Look
*Assistant Examiner* — Jesse Prager
(74) *Attorney, Agent, or Firm* — John M. Lenczyk

(57) ABSTRACT

A wind turbine apparatus includes a unit structure that is coupled to a central hub by way of an in-tension cable. The unit structure includes a first set of struts, wherein each strut in the first set of struts includes first and second ends, the first ends of the first set of struts are coupled to a first node and the first set of struts extend from the first node towards the central hub. The unit structure also includes a second set of struts, wherein each strut in the second set of struts includes first and second ends, the first ends of the second set of struts are coupled to the first node and the second set of struts extend from the first node away from the central hub.

18 Claims, 15 Drawing Sheets

- PRIOR ART -

- PRIOR ART -

WIND TURBINE BLADE SUPPORT STRUCTURE

TECHNICAL FIELD

The subject disclosure is generally related to wind turbine apparatuses, and more particularly to a structure for supporting blades of a wind turbine apparatus.

BACKGROUND

Currently there exist two primary types of wind turbine systems: horizontal axis systems and vertical axis systems. In a horizontal axis system, the blades rotate about an axis that is in line with approaching wind. In contrast, in a vertical axis system, the blades rotate about an axis that is substantially perpendicular to the approaching wind. In both types of wind turbine systems, stress concentrations applied at a blade root and central hub can limit the potential size of a wind turbine system.

Wind turbines have become an increasingly popular apparatus for generating electricity, as they are "clean" in that they do not require consumption of finite natural resources to generate electricity and do not emit environmentally damaging byproducts. Wind turbines utilize blades that transfer the kinetic energy of the wind into rotational mechanical energy which is then converted into electricity by coupled generators. An amount of electricity that may be generated by a wind turbine is, accordingly, a function of the cross sectional "sweep area" covered by the rotating blades perpendicular to the approaching wind. Stress limits on physical components used in wind turbine apparatuses, however, currently limit the energy capacity of systems that can be constructed. For example, in a horizontal axis wind turbine system, centrifugal forces acting on a turbine blade combined with resistance to gravity as passing the closest position to earth generate a large amount of cyclic stress at the blade root and central hub. An additional amount of cyclic stress on the rotor blade root is caused by a cyclic pressure fluctuation between the blade and a turbine mast as the blade is rotating. Resonant oscillations are also possible if exciting and structural frequencies coincide.

In addition, another important criterion in evaluating wind energy systems is the power produced on a per-unit cost basis. The cost of constructing a wind turbine system is directly related to the mass of the wind turbine system—accordingly, a significant reduction in mass will result in a significant reduction in cost. As noted above, however, the sweep area of the turbine blades determines the potential amount of energy that can be generated. Therefore, in wind turbine system design, attempts are made to reduce the mass of a system without reducing the sweep area of the turbine blades. In addition, structural integrity of wind turbine systems cannot be compromised in the attempt to reduce mass. Survival of wind turbine systems in severe storms is a key design consideration.

SUMMARY

A wind turbine apparatus includes a unit structure that is coupled to a central hub by way of an in-tension cable. The unit structure includes a first set of struts, wherein each strut in the first set of struts includes first and second ends, the first ends of the first set of struts are coupled to a first node and the first set of struts extend from the first node towards the central hub. The unit structure also includes a second set of struts, wherein each strut in the second set of struts includes first and second ends, the first ends of the second set of struts are coupled to the first node and the second set of struts extend from the first node away from the central hub.

In accordance with another aspect, a vertical axis wind turbine apparatus includes a plurality of unit structures that are coupled together to form an annular support structure. A unit structure includes a first strut with a first end and a second end, a second strut with a first end and a second end, a third strut with a first end and a second end, and a fourth strut with a first end and a second end. The unit structure also includes first node that receives the first ends of the first strut, the second strut, the third strut, and the fourth strut, wherein the first strut and the second strut extend from the first node toward the center of the annular support structure and the third strut and the fourth strut extend from the first node away from the center of the annular support structure, wherein the first strut and the second strut are approximately symmetric with one another about an axis passing through the first node towards the center of the annular support structure and the third strut and the fourth strut are approximately symmetric with one another about the axis. The unit structure also includes a second node that receives the second end of the first strut and a third node that receives the second end of the second strut, wherein another unit structure is coupled to the unit structure at the second and third nodes.

In accordance with yet another aspect, a method for constructing a windmill apparatus includes receiving a plurality of unit structures; coupling the unit structures together to create an annular support structure for blades of the windmill apparatus, and attaching the annular support structure to a central hub of the windmill apparatus by way of in-tension cables. The unit structure includes a first set of struts, wherein each strut in the first set of struts includes first and second ends, the first ends of the first set of struts are coupled to a first node and the first set of struts extend from the first node towards the central hub. The unit structure also includes a second set of struts, wherein each strut in the second set of struts includes first and second ends, the first ends of the second set of struts are coupled to the first node and the second set of struts extend from the first node away from the central hub.

According to still another aspect, a method for extracting energy from wind includes detecting environmental parameters and independently controlling an angle of attachment of a plurality of blades in a wind turbine apparatus based at least in part upon the detected environmental parameters.

Those skilled in the art will appreciate still other aspects of the present application upon reading and understanding the attached figures and description.

DETAILED DESCRIPTION

Figure 1:
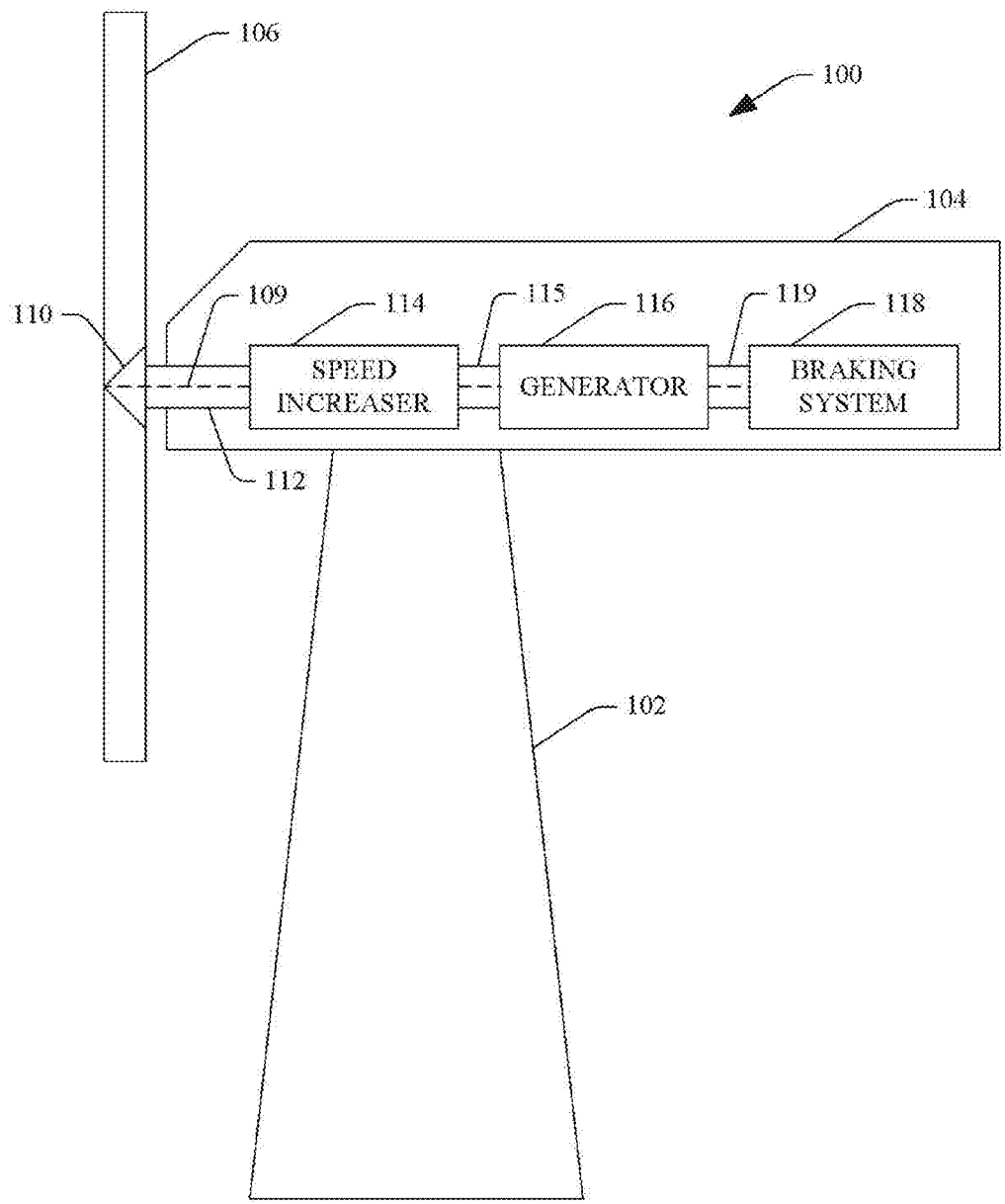
FIG. 1 is an example horizontal axis wind turbine apparatus.

With reference to FIG. 1, an example block diagram of a horizontal axis wind turbine apparatus 100 is illustrated. The wind turbine apparatus 100 includes a tower 102 that supports a housing (nacelle) 104 and blade(s) 106. The blade(s) 106 rotate about an axis 109 and are coupled to a central hub 110. While shown as being directly coupled to a central hub 110, it is to be understood that a supporting structure that is described in greater detail herein may be used to couple one or more blade(s) 106 to the central hub 110. A rotating linkage 112 is coupled to the central hub 110 and rotates as the blade(s) 106 rotate.

Approaching wind turns the blade(s). A speed increaser 114 coupled to the rotating linkage 112 provides a mechanism to increase the rotational velocity of a rotating linkage 115 entering the generator 116. The generator 116 transforms the mechanical energy to electrical power. Mechanisms for retaining and/or transferring electrical power output by the generator 116 are not shown or described herein for sake of brevity. The nacelle 104 also retains a braking system 118 that slows rotational velocity of a rotating linkage 119 and, thus, the blade(s) 106.

Figure 2:
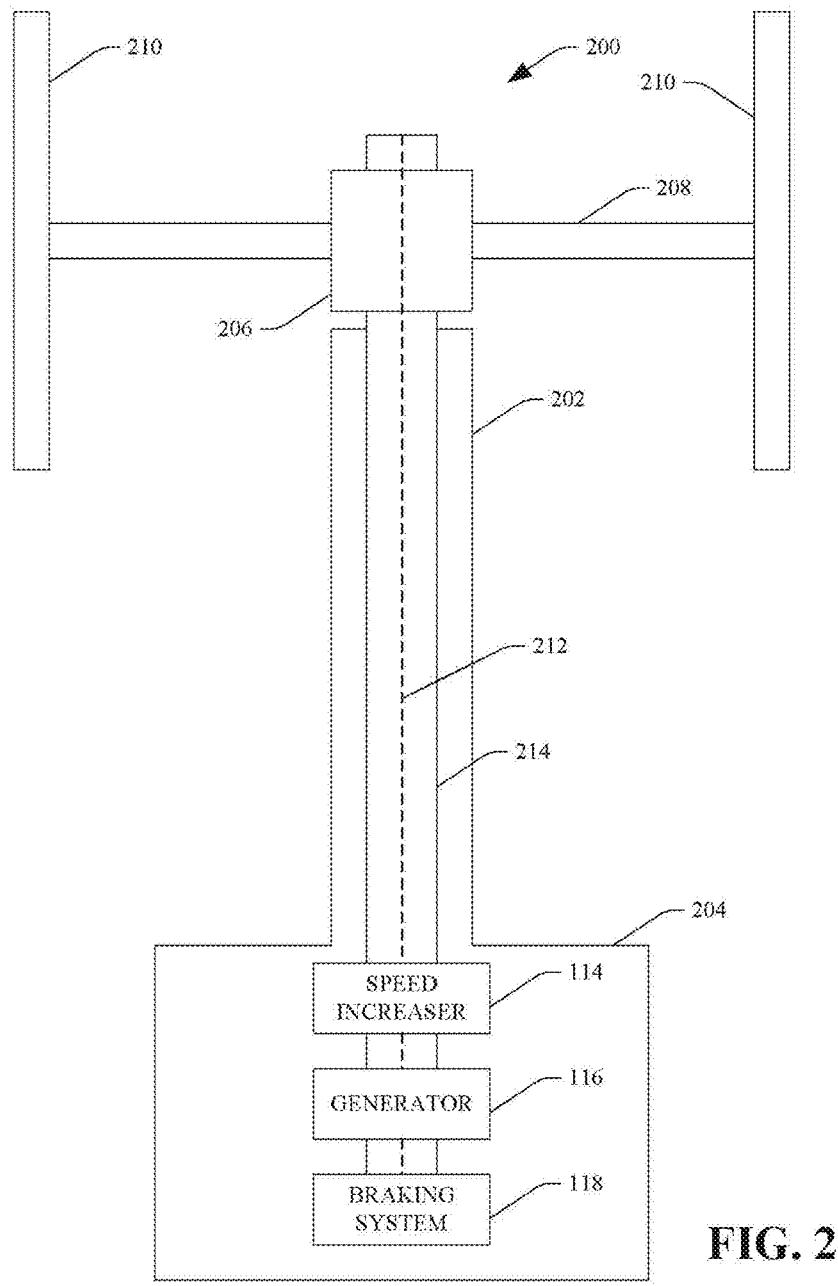
FIG. 2 is an example vertical axis wind turbine apparatus.

Now referring to FIG. 2, an example block diagram of a vertical axis wind turbine apparatus 200 is illustrated. The wind turbine apparatus 200 includes a tower 202 supported by a base 204 structure. The blade(s) 210 are coupled to a support structure 208. The support structure 208 is coupled to a central hub 206. The central hub 206 rotates about the tower 202. The blade(s) 210 rotate about an axis 212 oriented approximately perpendicular to earth. A rotating linkage 214 is coupled to the central hub 206, and rotates about the axis 212 as the blade(s) 210 rotate about the axis 212.

In the vertical axis wind turbine apparatus 200, the base structure 204 retains the speed increaser 114, the generator 116, and the braking system 118, which operate as described above. Specifically, wind power rotates the blade(s) 210 about the vertically-oriented axis 212, thereby rotating the linkage 214 that is coupled to the blade(s) 210 by way of the central hub 206. The speed increaser 114 is coupled to the linkage 214 and may be used to increase the rotational velocity of the generator 116. The generator 116 is coupled to the rotating linkage 214 and transforms rotational, mechanical energy of the rotating linkage 212 to electrical power. The braking system 118 may be used to decrease the rotational velocity of the rotating linkage 214 and, thus, the blade(s) 210.

Figure 3:
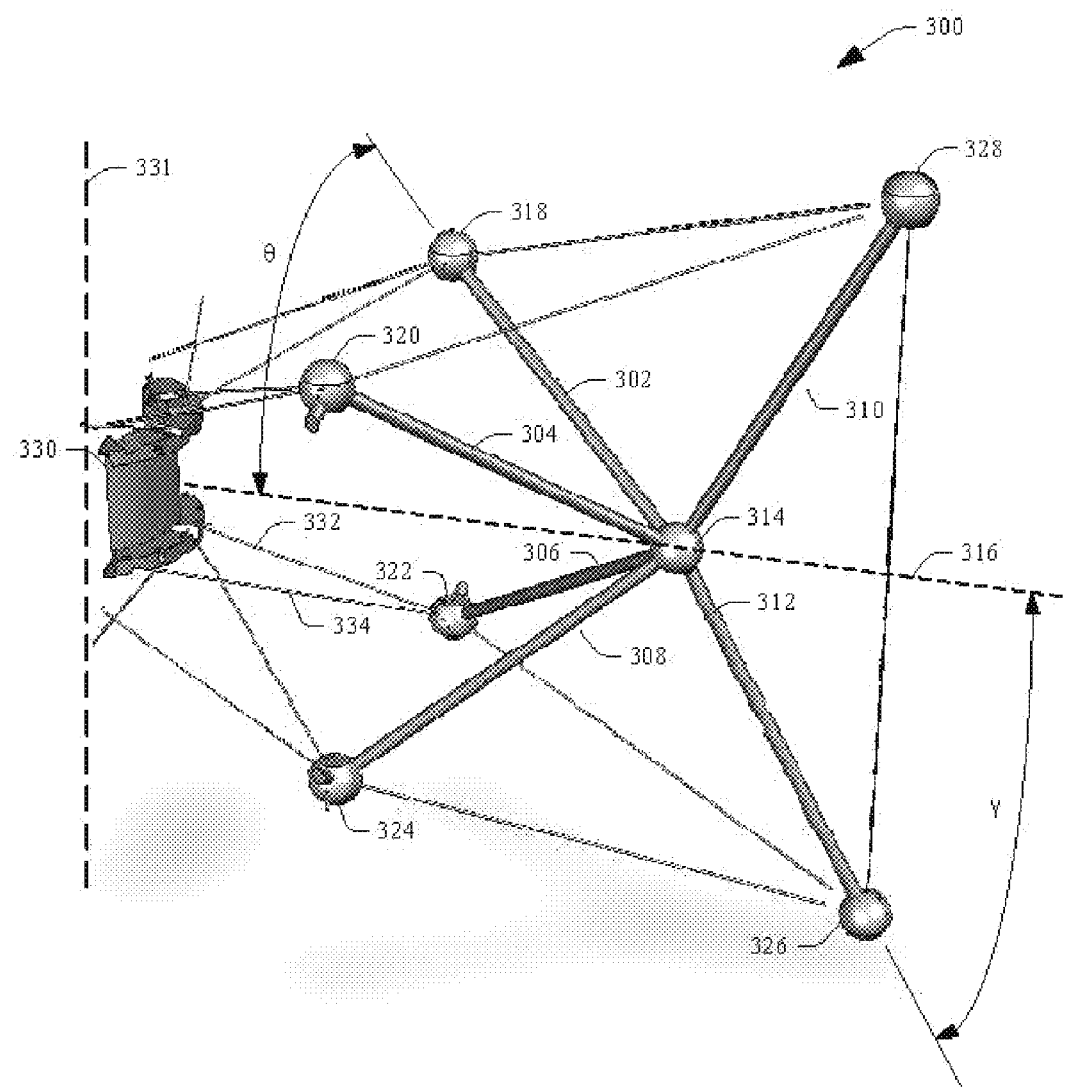
FIG. 3 is an example unit structure.

Now referring to FIG. 3, a unit structure 300 used in creating a supporting structure for wind turbine blade(s) (such as support structure 208) is illustrated. The unit structure 300 is the base unit for a support structure that supports blade(s) in a wind turbine apparatus. While the support structures shown and described below will be described with respect to a vertical axis wind turbine, it is to be understood that the support structures may also be used to support blades of a horizontal axis wind turbine.

The unit structure 300 includes six struts, 302, 304, 306, 308, 310, and 312, which have first and second ends, wherein the first ends of the struts 302-312 are each coupled to a junction node 314. The struts 302, 304, 306, and 308 extend in a first direction along an axis 316 that passes through the junction node 314. Struts 302, 304, 306, and 308 are approximately equal in length. In addition, the struts 302, 304, 306, and 308 are arranged at a substantially similar angle with respect to horizontal and vertical planes not shown. If the axis 316 is perceived to be an axis in a three-dimensional coordinate system, the struts 302 and 304 are approximately symmetric to struts 306 and 308 with respect to a first plane of a coordinate system (not shown) and the struts 302 and 306 are approximately symmetric with respect to a second plane of the coordinate system (not shown) to struts 304 and 308. The struts 310 and 312 are approximately symmetrical about the first plane of the coordinate system (not shown) and extend in a second direction along the axis 316 opposite the first direction. In an example, the Cosine value of an angle γ between the axis in the second direction and the struts 310 and 312 may be approximately one half the Cosine value of the angle θ between the axis 316 and the struts 302, 304, 306, and 308 for equalization of the compressive loads applied to all struts.

The second ends of each of the struts 302, 304, 306, 308, 310, 312 are respectively coupled to nodes 318, 320, 322, 324, 328, 326. The nodes 318, 320, 322, 324 serve multiple purposes. For instance, one or more of the nodes 318, 320, 322, 324 can receive ends of struts from an adjacent unit structure. In addition, the nodes 318, 320, 322, 324 may be coupled to a central hub 330 of a wind turbine apparatus by way of in-tension cabling. As shown, each of the nodes 318, 320, 322, 324 may be coupled to the central hub 330 by way of at least one cable. As an example, the node 322 is coupled to a lower portion of the central hub by way of cables 332 and 334. In an example, the cables 332 and 334 (and other cables used to couple the unit structure 300 with the central hub 330) may be coupled approximately tangentially to the central hub 330. The unit structure 300, blades (not shown), and the central hub 330 rotate about an axis 331 that passes through the central hub 330.

The nodes 326 and 328 may be referred to as blade nodes and are coupled, for example, to a wind turbine blade. In addition, cabling may couple the node 326 with the node 328, as well as couple the nodes 318 and 320 with the node 328 and the node 322 and 324 with the node 326. Coupling the nodes of the unit structure 300 with one another by way of in-tension cabling compresses the struts 302-312 and stabilizes, for instance, an annular plurality of unit structures 300. Using cabling to couple the unit structure 300 to the central hub 330 allows stresses to be passed to the central hub 330 by way of the cabling. Furthermore, a mass-efficient blade support structure may be produced by using the unit structure 300.

Coupling of struts to nodes and nodes to central hub (by way of cabling) can be accomplished by way of any suitable means. For example, ends of the struts may be threaded and the nodes may have corresponding threaded apertures. In another example, the nodes may include non-threaded apertures and the struts may be held in place by tension provided by way of cabling.

Figure 3A:
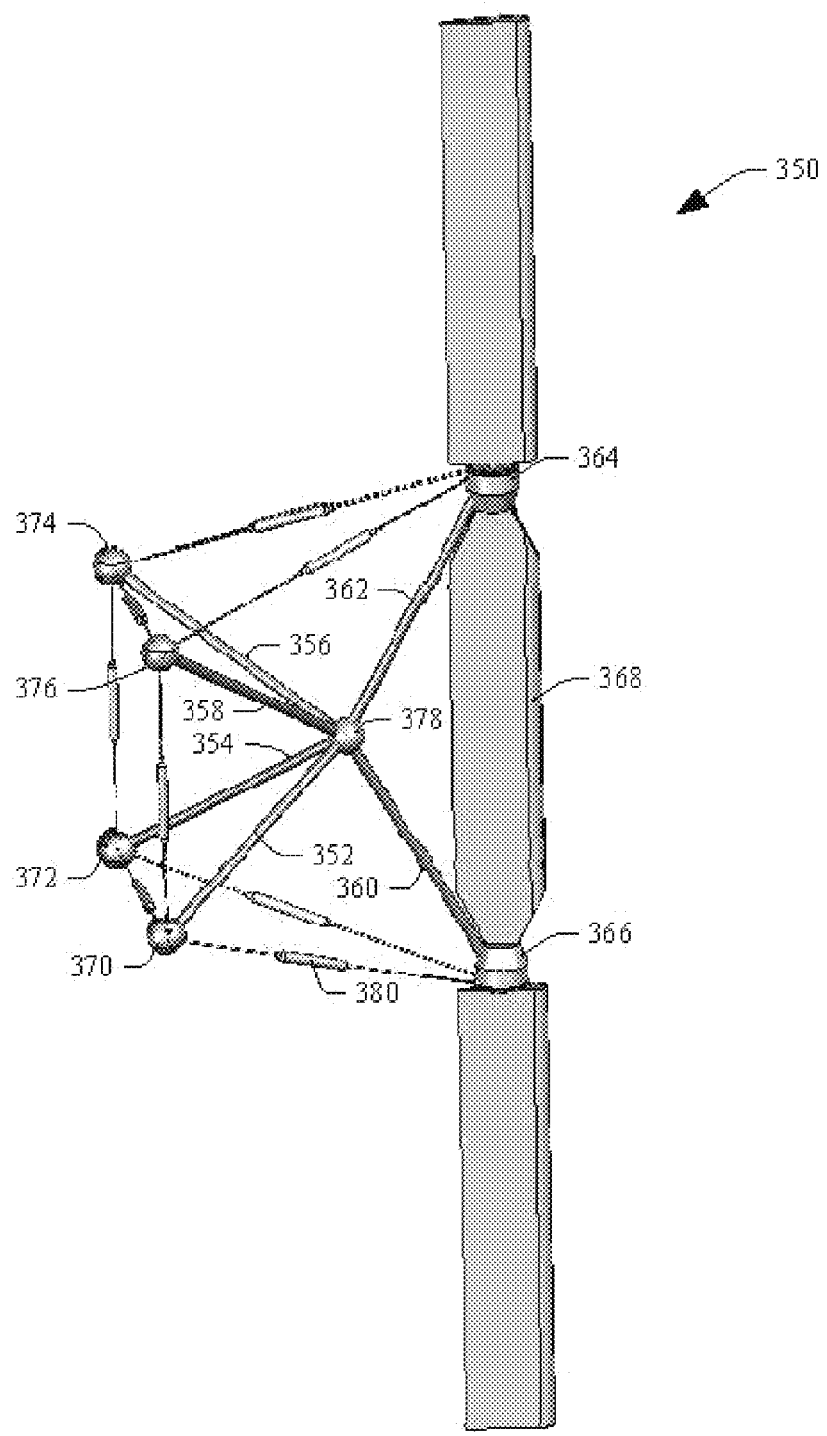
FIG. 3A illustrates an example unit structure.

Referring briefly to FIG. 3A, another example unit structure 350 is illustrated. The unit structure 350 includes struts 352, 354, 356, 358, 360, and 362, which are arranged substantially as described above. The unit structure 350 includes blade nodes 364 and 366, which are used to couple the unit structure to one or more blades 368. The unit structure 350 additionally includes nodes 370, 372, 374, and 376, as well as a junction node 378, which operate similar to corresponding portions of the unit structure 300 described above.

Various in-tension cables are coupled to nodes of the unit structure 350 as illustrated. The cables may include a damper (e.g., damper 380), which may be used to damp vibration of cables in the unit structure 350. An example damper will be described in detail below.

Figure 4:
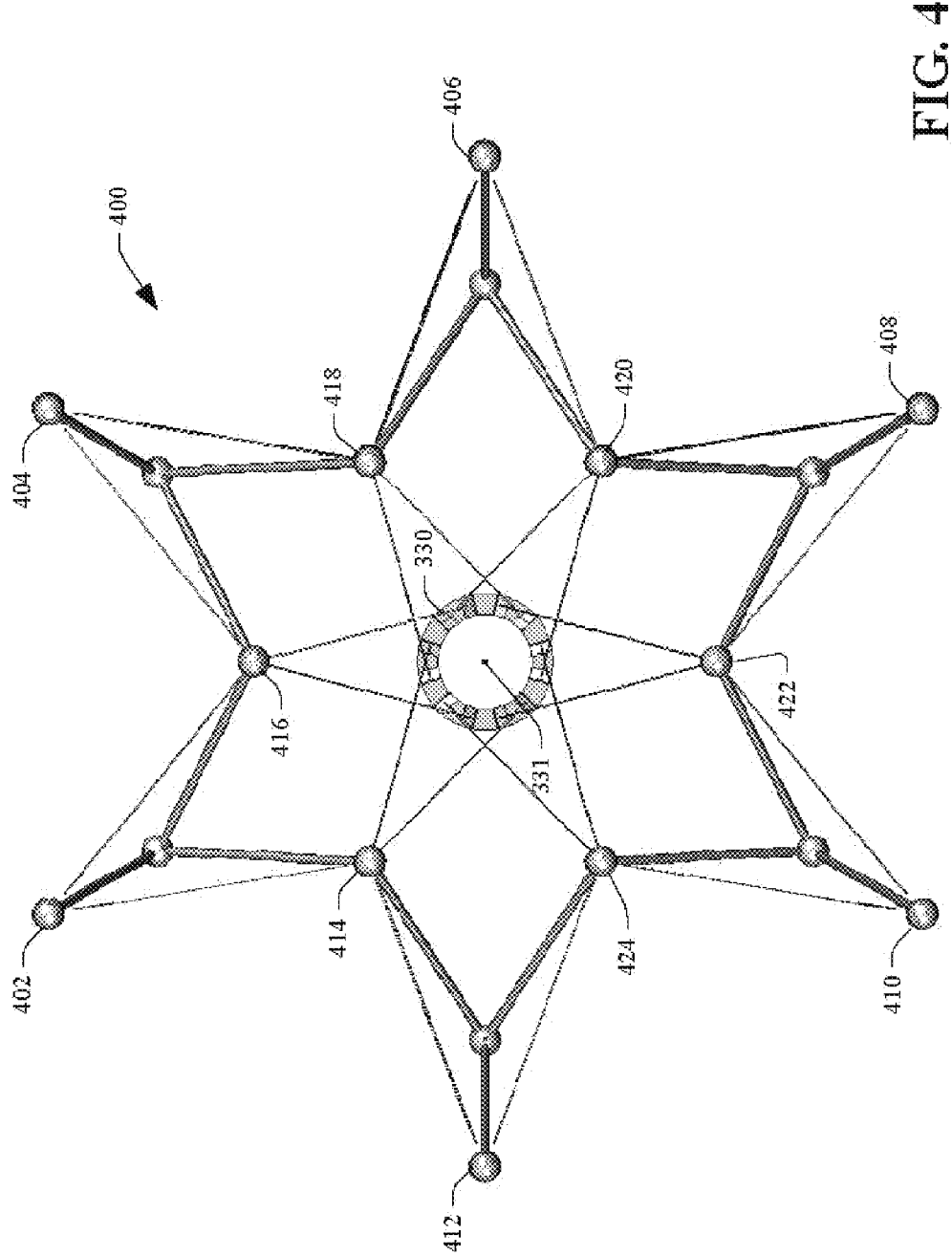
FIGS. 4-6 are views of an example annular support structure.

With reference now to FIG. 4, an overhead view of an example annular blade support structure 400 for use in a wind turbine is illustrated, wherein the annular structure 400 includes a plurality of unit structures coupled together by way of nodes. In this example, the annular structure 400 includes six unit structures—however, a number of unit structures in an annular structure may be determined based upon size of the annular structure 400, size of the unit structure, amount of desired mass, mass of blade(s), and other factors.

When several unit structures are coupled together in the manner shown, an approximately rigid structure results (whether or not the annular structure 400 is coupled to the central hub 330). For instance, when force is applied to nodes 402-412 in a direction towards the center of the central hub 330 and force is applied to nodes 414-424 in a direction away from the central hub the annular structure 400 becomes approximately rigid. These forces can be applied at least in part by cabling used in the annular structure 400. Additionally, these forces are applied to the aforementioned nodes when the annular structure 400 is subject to rotational force (e.g., when blades supported by the annular structure 400 are moved by way of wind).

It is to be noted that the annular structure 400 is not a tensegrity, as struts of a tensegrity are not coupled at their ends, but are instead coupled by in-tension cabling. In addition, in contrast to conventional support structures, the annular structure 400 may be coupled to a central hub by way of in-tension cables, whereas these cables not only transfer torque (similar to a bicycle wheel), but also act as inward tension devices for the annular structure. Conventional support structures are coupled to the central hub 330 by struts.

Figure 5:
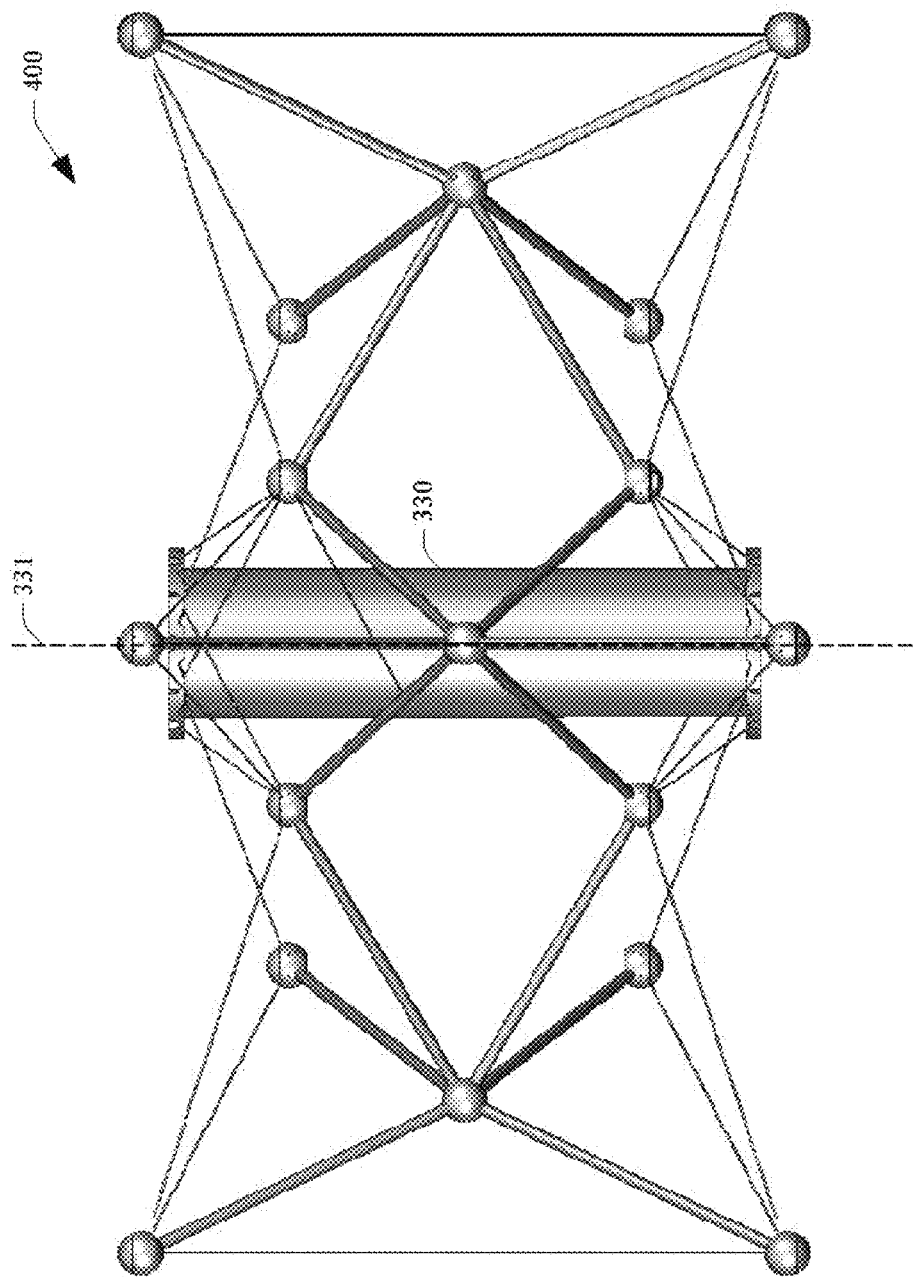

Now referring to FIG. 5, a side view of the annular structure 400 is provided. In this view, a height of the central hub 330 is shown. Again, the height of the hub may vary depending upon design (e.g., size) of the unit structures, design of a tower that supports the annular structure 400, and other factors. For instance, the greater the height of the central hub 330, the larger the supporting moment arm, thereby providing greater stability with respect to the annular structure 400.

Figure 6:
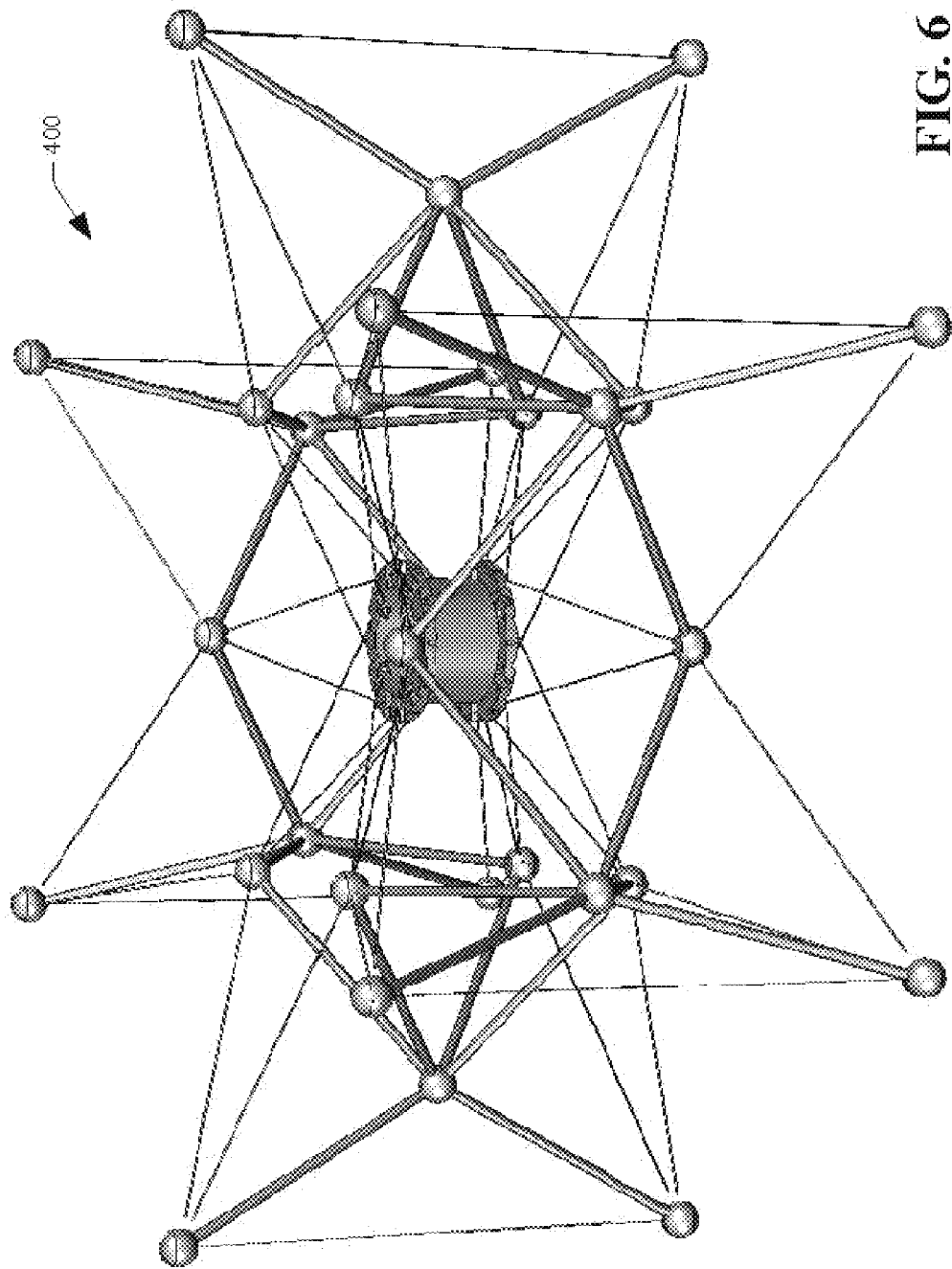

Turning to FIG. 6, a perspective view of the annular structure 400 is provided. As will be shown in greater detail below, the annular structure 400 can be coupled to the central hub 330 and attached to a wind turbine tower.

Figure 7:
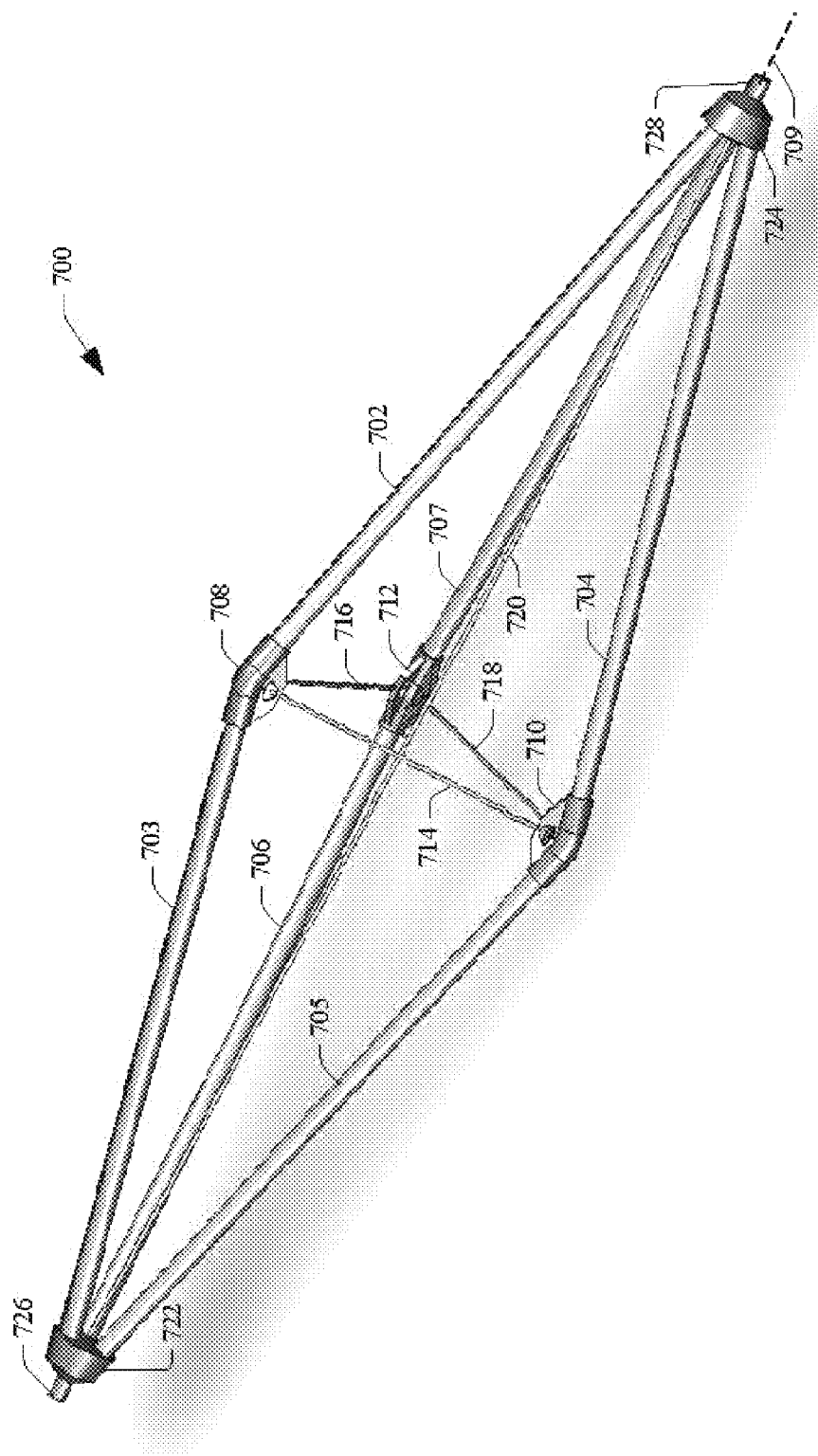
FIG. 7 is a view of an example self-similar structure.

With reference now to FIG. 7, a self-similar structure 700 that may be used to further reduce mass of the unit structure 300 (FIG. 3) and, thus, the annular structure 400 (FIGS. 4-6) is illustrated. The self-similar structure 700 includes a plurality of struts 702, 703, 704, 705, 706, and 707 whose mass is collectively less than mass of any strut 302-310 in the unit structure 300. The self-similar structure 700 has similar compression strength, however, when compared with conventional struts. Accordingly, mass of the unit structure 300 (and thus the annular structure 400) is reduced without substantial loss of compression strength. For instance, each strut 302-310 of each unit structure of the annular structure 400 may be replaced by the self-similar structure 700. The struts 702, 703, 704, 705, 706, and 707 are angularly displaced approximately equal from one another with respect to an axis 709 that is central to the self-similar structure 700.

As noted above, the self-similar structure 700 includes struts 702, 703, 704, 705, 706, and 707. These struts are substantially equal in geometry—that is, each of the struts 702, 703, 704, 705, 706, and 707 have substantially similar lengths. The struts 702, 704 and 706 are connected to struts 703, 705 and 707 respectively by elbow nodes 708, 710, and 712. Cables 714, 716 and 718 are in tension between the elbow nodes 708, 710, and 712. A central cable 720 provides support in tension between the self similar end caps 722 and 724. Tension exists in at least some of the cables 714, 716, 718, and 720 of the self similar structure 700. The struts 702, 703, 704, 705, 706, and 707 of the self similar structure 700 thus become loaded in compression.

The two end caps 722 and 724 receive first ends of each of the struts 702, 703, 704, 705, 706, and 707. Additionally, the cable 720 that is in tension is coupled to the end cap 722 and the end cap 724 and provides a compression force between the end cap 722 and the end cap 724. The struts 702, 703, 704, 705, 706, and 707 may be coupled to the end caps 722 and 724 by any suitable manner. For instance, the end caps 722 and 724 may include apertures that are configured to receive ends of the struts 702, 703, 704, 705, 706, and 707, and the struts may be held in place at least by the compression force provided by the cables 714, 716, 718 and 720. Other fastening techniques are also contemplated and are intended to fall under the scope of the hereto-appended claims.

The end caps 722 and 724 are shown as having pins 726 and 728 extending therefrom, respectively. These pins can be inserted into apertures of hubs that were described with respect to the unit structure 300 (FIG. 3). While shown as including three struts, the self-similar structure 700 may be designed to include a different number of struts. Additionally, coupling of struts to elbows and struts to end caps may have a greater degree of freedom for a more equal distribution of load. In addition, each strut of the self-similar structure 700 may itself be replaced by a self-similar structure.

Figure 7A:
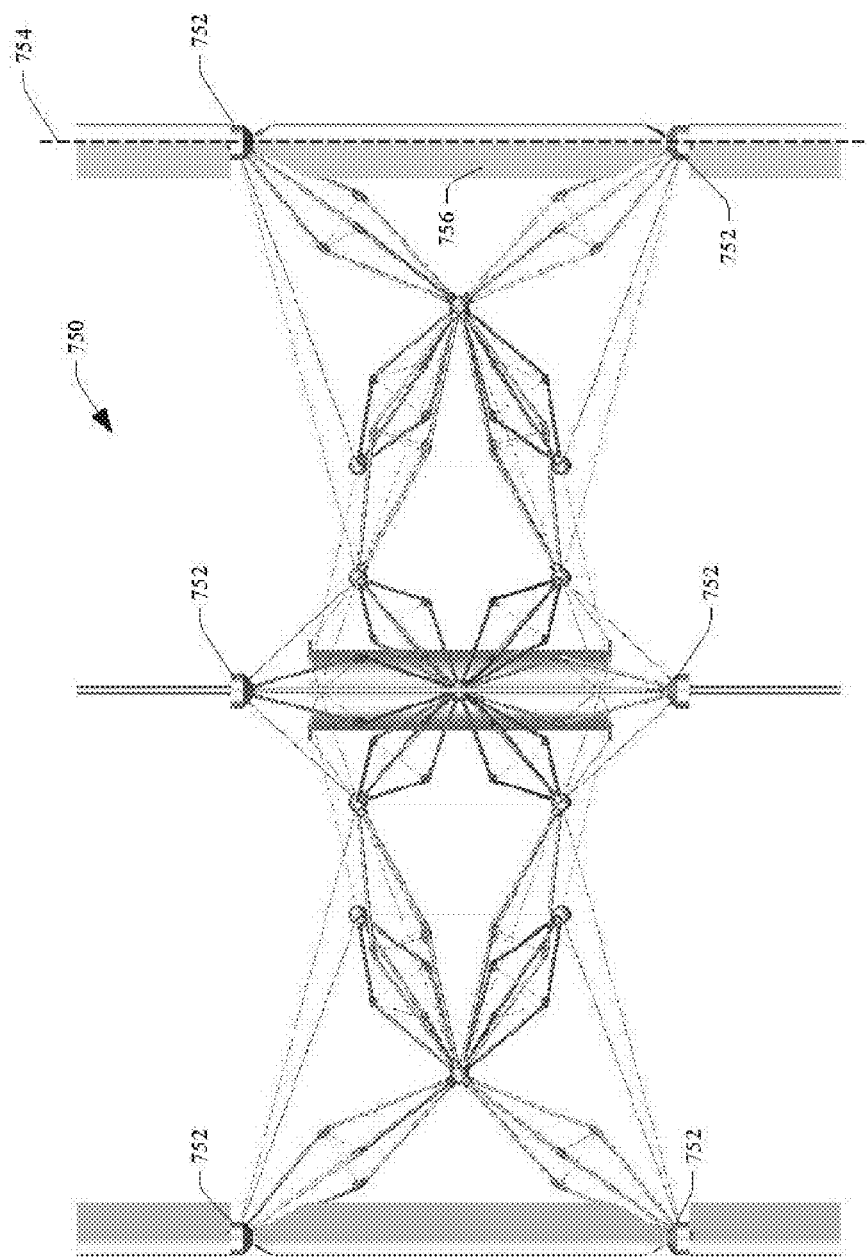
FIG. 7A illustrates a front view of an example annular support structure.

Now turning to FIG. 7A, an example of an annular wind turbine structure 750 is illustrated, wherein the structure 750 includes self similar structures. A blade support node 752 has multiple purposes. One purpose of the blade support node 752 is to substitute for a common node in providing a coupling between intersecting struts and cables of the annular support structure 750. Another purpose of the blade support node 752 is to support a central axis 754 of the turbine blade by means of a bearing. Another purpose of the blade support node 752 is to provide housing for a hydraulic actuator system that can control the pitch of a blade 756 relative to approaching wind. Another purpose of the blade support node 752 is to provide housing to a control system that communicates the blade pitch to a computing device. The blade support node 752 provides the same function to annular structures that do not include self-similar structures.

Figure 7B:
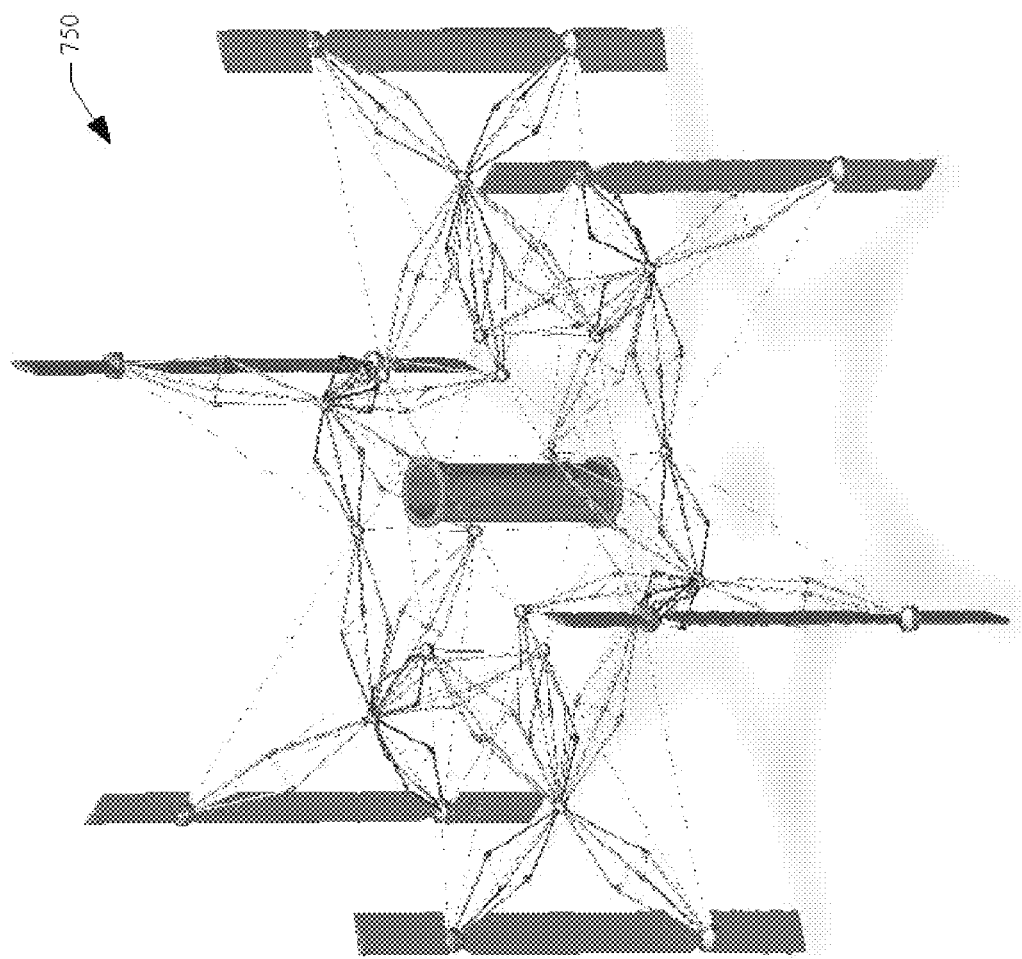
FIG. 7B illustrates an isometric view of an example annular support structure.
Figure 7C:
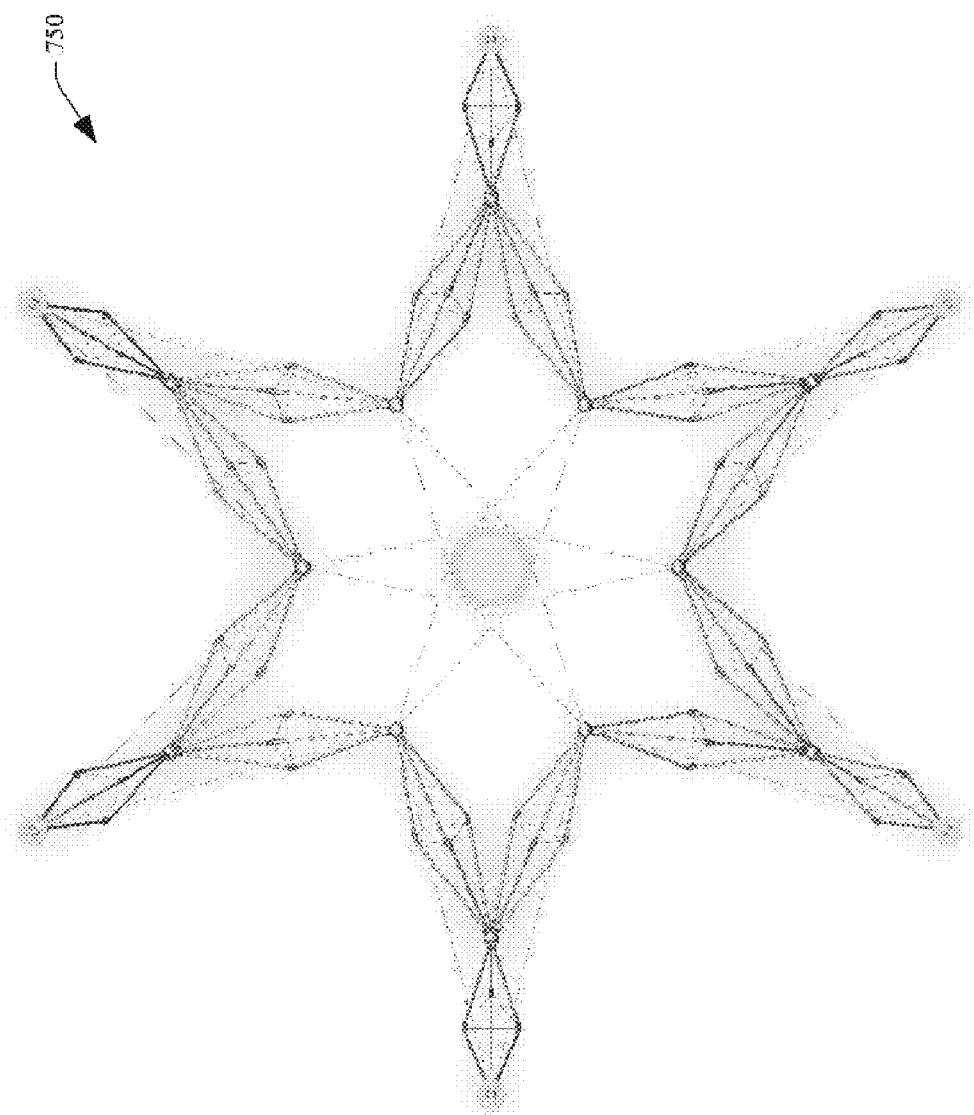
FIG. 7C illustrates an overhead view of an example annular support structure.

Referring collectively to FIGS. 7B and 7C, an overhead view and an isometric view of the annular wind turbine structure 750 are provided.

Figure 8:
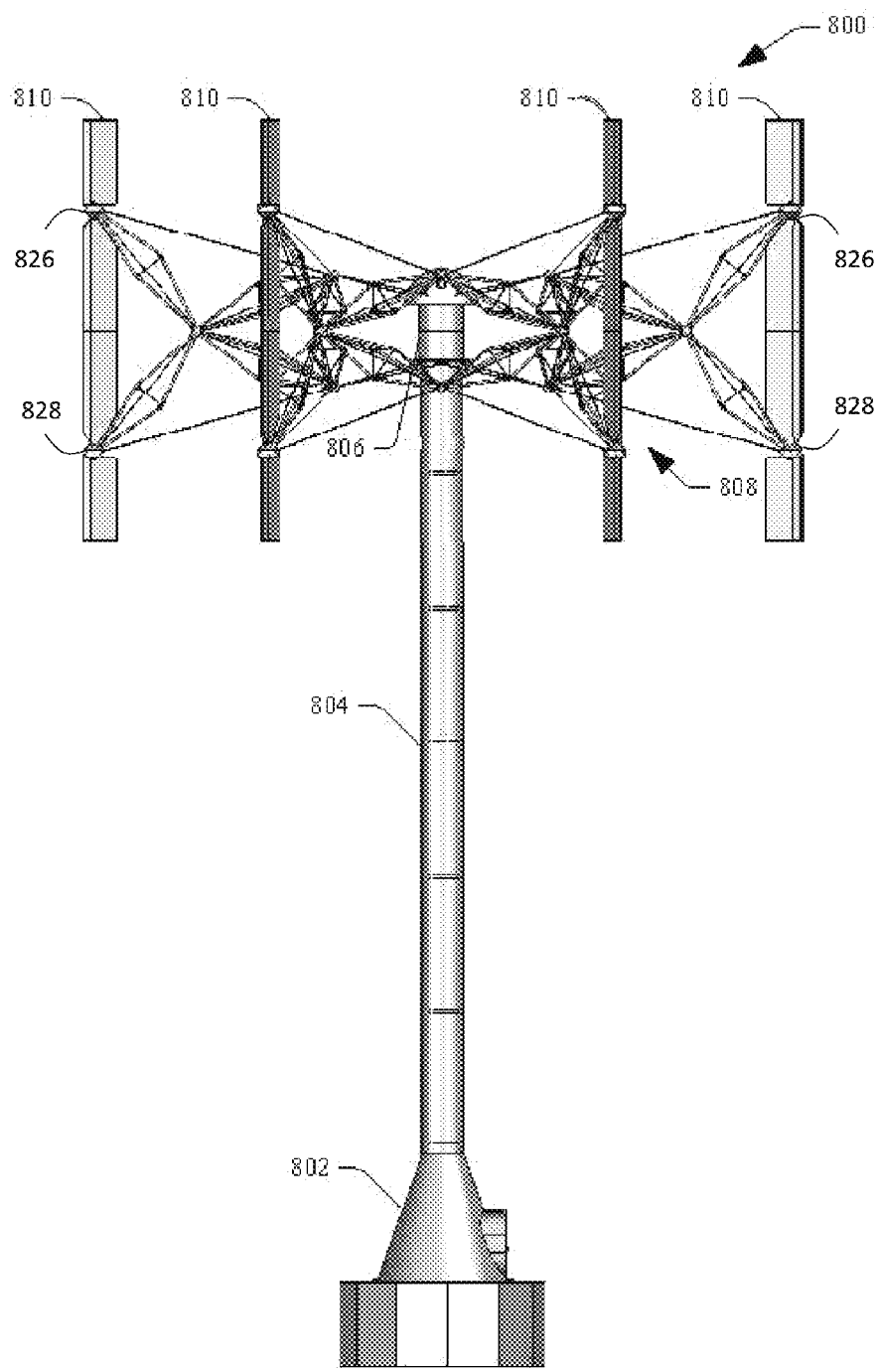
FIG. 8 is an example vertical axis wind turbine apparatus.

Now turning to FIG. 8, an example vertical axis wind turbine 800 that includes a support structure described above. The wind turbine 800 includes a base 802 that supports a tower 804. A central hub 806 is supported by the tower 804 and coupled to a support structure 808 that accords to the description of the unit structure 300, the support structure 600, and the self-similar structure 700 described above. In this example, the support structure 808 includes six unit structures that support a plurality of blades 810. Wind energy received by the blades 810 causes the blades 810 (and the supporting structure 808) to rotate about a central axis (e.g., the center of the tower 804).

Figure 8A:
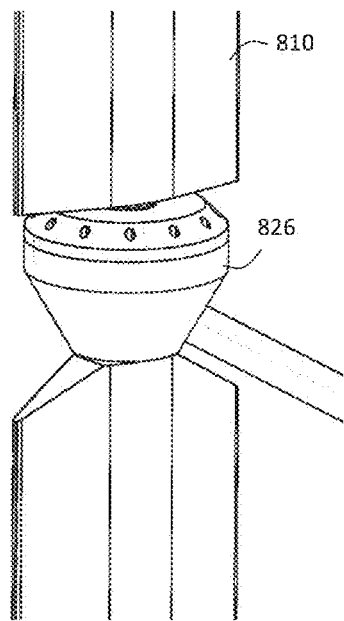
FIG. 8A is a perspective view of a blade of a vertical axis wind turbine apparatus.
Figure 8B:
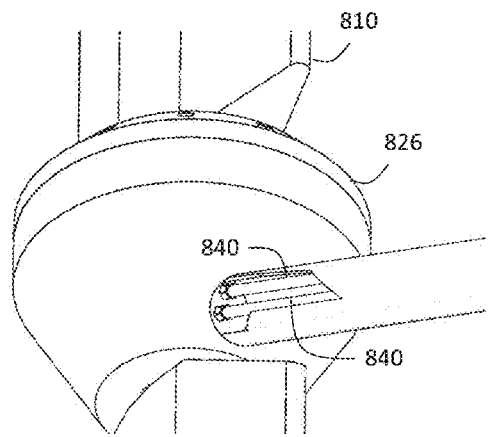
FIG. 8B is a cutaway view of the blade of FIG. 8A.
Figure 8C:
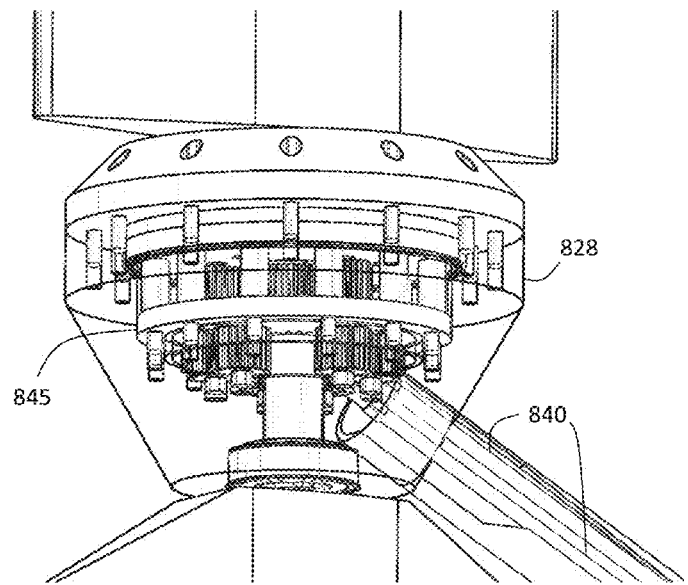
FIG. 8C. is a cutaway view of the blade of FIG. 8A.

The blades 810 may be coupled to the support structure 808 by way of nodes 826 and 828, which are similar to nodes 326 and 328 shown in FIG. 3. The struts of the support structure 808 may be of steel, aluminum or composite materials, and may be tubular or non-tubular. Cables may be run through the struts to provide additional "post tension" compression strength. In another example, the nodes 826 and 828 that couple the blades 810 to the support structure may include actuators that optimize the angle of attachment of the blades 810 in such a position to extract maximum wind power. In other words, each of the blades 810 may be independently controlled such that the wind turbine 800 extracts maximum power from approaching wind. Sensors (not shown) can sense environmental parameters, such as wind velocity, wind direction, current rotational velocity of the blades 810, and other suitable parameters. As best shown in FIGS. 8A-8C, hydraulic fluid lines 840 may be placed inside tubing of at least some of the struts of the support structure such that the hydraulic fluid lines 840 run from a source of power in the tower 804, the base 802 and/or the central hub 806 of the wind turbine 800 to a node 826 that couples the support structure 808 to the blade 810. One or more nodes that couple the blades 810 to the support structure 808 include hydraulic motors 845 that are provided with power by way of the hydraulic fluid lines 840. The hubs may further include sensors to determine current position of each blade 810. Control logic in the hydraulic motor 845 causes the hydraulic motor 845 to position a blade in response to current sensed parameters.

Figure 9:
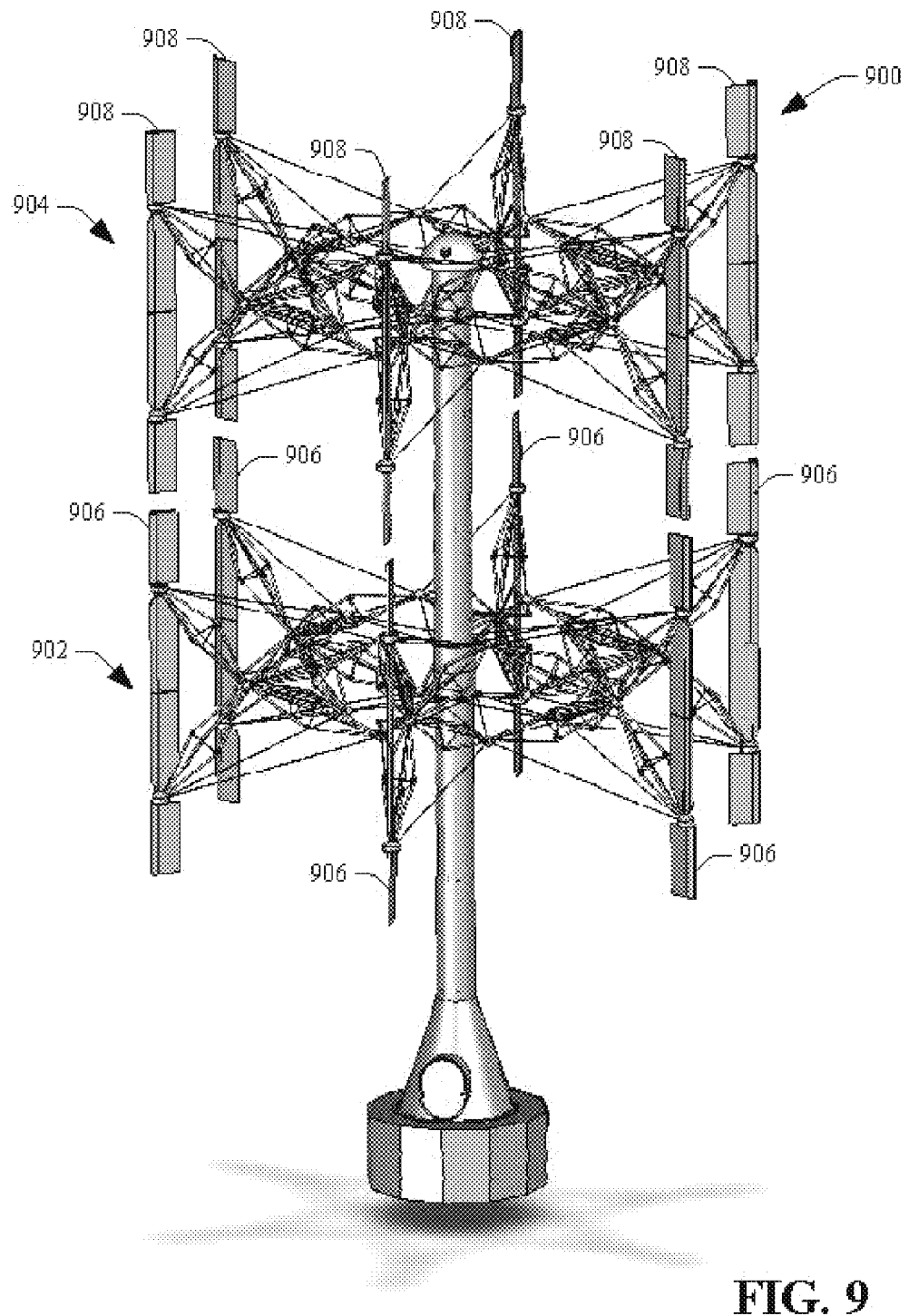
FIG. 9 is an example vertical axis wind turbine apparatus.

Turning now to FIG. 9, an example wind turbine apparatus 900 is illustrated. The wind turbine apparatus 900 includes two support structures 902 and 904 for supporting two different sets of six blades 906 and 908. Use of multiple structures increases a cross-sectional area where wind will hit blades, thus providing an ability to generate a greater amount of power. Blade orientation may be optimized separately on each support structure to maximize capture of wind energy.

Figure 10:
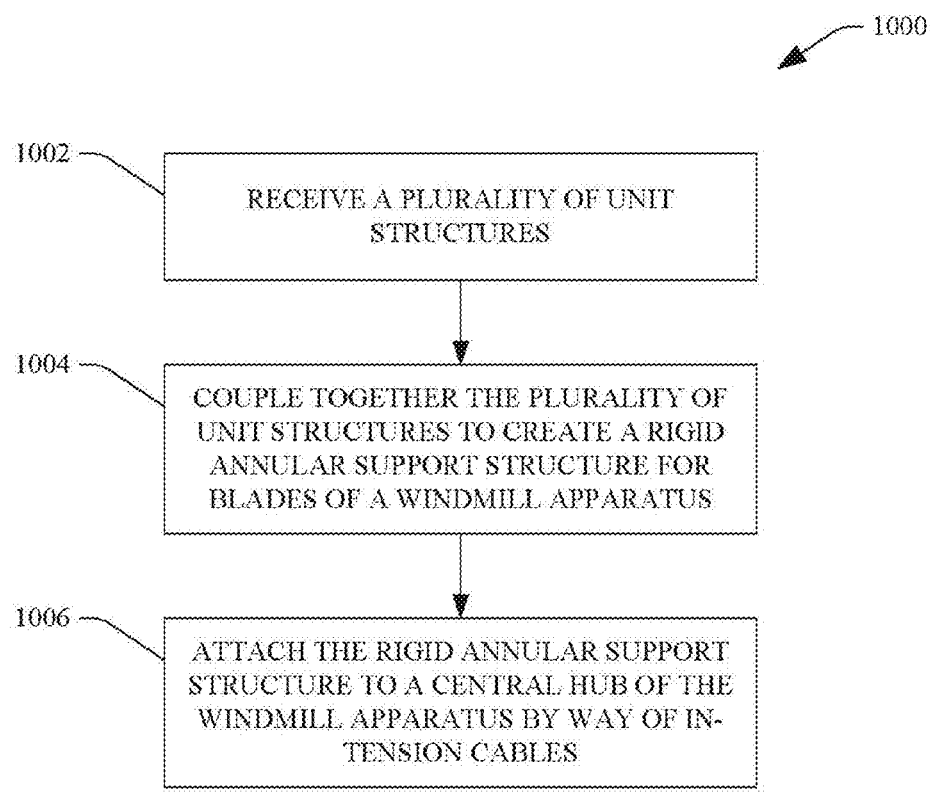
FIG. 10 is a method for constructing a wind turbine apparatus.

Referring now to FIG. 10, a method 1000 for constructing a wind turbine apparatus is illustrated. While shown as a series of acts, it is to be understood that the method 1000 is not to be limited by the order of acts and that additional acts may be performed while still falling within the scope of the method 1000.

At 1002, a plurality of unit structures are received. An example unit structure is shown and described with respect to FIG. 3. At 1004, the plurality of unit structures are coupled together to create a rigid annular support structure for blades of the windmill apparatus. An example annular support structure is shown and described with respect to FIGS. 4-6. At 1006, the rigid annular support structure is attached to a central hub of the windmill apparatus by way of in-tension cables.

It is noted that several examples have been provided for purposes of explanation. These examples are not to be construed as limiting the hereto-appended claims. Additionally, it may be recognized that the examples provided herein may be permutated while still falling under the scope of the claims.

What is claimed is:

1. A wind turbine apparatus, comprising:
a unit structure that is coupled to a central hub by way of an in-tension cable, wherein the unit structure comprises:
a first set of struts, wherein each strut in the first set of struts includes first and second ends, the first ends of the first set of struts are coupled to a first node and the first set of struts extend from the first node towards the central hub; and
a second set of struts, wherein each strut in the second set of struts includes first and second ends, the first ends of the second set of struts are coupled to the first node and the second set of struts extend from the first node away from the central hub,
wherein at least two struts in the first set of struts are symmetric with one another about a substantially horizontal plane that extends through the first node and the central hub and at least two struts in the second set of struts are approximately symmetric with one another about said substantially horizontal plane.

2. The wind turbine apparatus of claim 1, wherein the first set of struts includes four struts and the second set of struts includes two struts.

3. The wind turbine apparatus of claim 2, wherein the cosine value of a first angle between a strut of the first set of struts and an axis defined by said substantially horizontal plane and a substantially vertical plane perpendicular to said horizontal plane is approximately double the cosine value of a second angle between a strut of the second set of struts and said axis.

4. The wind turbine apparatus of claim 1 being a vertical axis wind turbine apparatus.

5. The wind turbine apparatus of claim 1, further comprising a plurality of in-tension cables, wherein the second ends of the first set of struts are each coupled to a corresponding first set of nodes, each of the first set of nodes are coupled to the central hub by way of the plurality of in-tension cables.

6. The wind turbine apparatus of claim 5, wherein at least one cable of the plurality of cables includes a damping device that reduces vibration of the at least one cable.

7. The wind turbine apparatus of claim 5, wherein the second ends of the second set of struts are each coupled to a corresponding second set of nodes, each node in the first set of nodes is coupled to at least one node in the second set of nodes by way of in-tension cabling.

8. The wind turbine apparatus of claim 7, further comprising a blade, wherein the blade is attached to the unit structure by way of the second set of nodes.

9. The wind turbine apparatus of claim 8, further comprising a hydraulic motor that is housed in a node in the second set of nodes, wherein the hydraulic motor is configured to position the blade in accordance with sensed environmental parameters.

10. The wind turbine apparatus of claim 9, further comprising a hydraulic line that passes through a passage of a strut in the unit structure to provide power to the hydraulic motor.

11. The wind turbine apparatus of claim 1, wherein a strut of the unit structure is a self-similar structure.

12. A wind turbine apparatus, comprising:
a plurality of unit structures that are coupled together to form an annular support structure, wherein a unit structure comprises:
a first strut with a first end and a second end;
a second strut with a first end and a second end;
a third strut with a first end and a second end;
a fourth strut with a first end and a second end;
a first node that receives the first ends of the first strut, the second strut, the third strut, and the fourth strut, wherein the first strut and the second strut extend from the first node toward the center of the annular support structure and the third strut and the fourth strut extend from the first node away from the center of the annular support structure, wherein the first strut and the second strut are approximately symmetric with one another about a substantially horizontal plane passing through the first node and the center of the annular support structure and the third strut and the fourth strut are approximately symmetric with one another about said substantially horizontal plane;
a second node that receives the second end of the first strut; and a third node that receives the second end of the second strut, wherein another unit structure is coupled to the unit structure at the second and third nodes.

13. The wind turbine apparatus of claim 12, wherein the second and third nodes also receive ends of two struts of another unit structure.

14. The wind turbine apparatus of claim 12, further comprising:
    a fourth node that receives the second end of the third strut;
    a fifth node that receives the second end of the fourth strut; and
    a blade, wherein the fourth and fifth nodes support the blade.

15. The wind turbine apparatus of claim 12, wherein at least one of the first strut, the second strut, the third strut, or the fourth strut is a self-similar structure.

16. The wind turbine apparatus of claim 12, wherein the unit structure further comprises:
    a fifth strut with a first end and a second end; and
    a sixth strut with a first end and a second end, wherein the first ends of the fifth strut and the sixth strut are received by the first node, extend towards the center of the annular support structure, and are approximately symmetrical with one another about the substantially horizontal plane and are also approximately symmetrical with the first strut and the second strut about a substantially vertical plane.

17. The wind turbine apparatus of claim 12, further comprising an in-tension cable with a first end and a second end, wherein the first end of the in-tension cable is coupled to the second node and the second end of the in-tension cable is coupled to a central hub of the wind-turbine apparatus.

18. A method for constructing a windmill apparatus, comprising:
    receiving a plurality of unit structures;
    coupling the unit structures together to create an annular support structure for blades of the windmill apparatus; and
    attaching the annular support structure to a central hub of the windmill apparatus by way of in-tension cables, wherein the unit structure comprises:
    a first set of struts, wherein each strut in the first set of struts includes first and second ends, the first ends of the first set of struts are coupled to a first node and the first set of struts extend from the first node towards the central hub; and
    a second set of struts, wherein each strut in the second set of struts includes first and second ends, the first ends of the second set of struts are coupled to the first node and the second set of struts extend from the first node away from the central hub,
    wherein at least two struts in the first set of struts are symmetric with one another about a substantially horizontal plane that extends through the first node to the central hub and at least two struts in the second set of struts are approximately symmetric with one another about said substantially horizontal plane.

* * * * *